US012578888B2

(12) United States Patent
Tomkins et al.

(10) Patent No.: US 12,578,888 B2
(45) Date of Patent: Mar. 17, 2026

(54) MANAGING COMPUTATIONAL STORAGE OPERATIONS

(71) Applicant: International Business Machines Corporation, Armonk, NY (US)

(72) Inventors: Dominic Tomkins, Alton (GB); Evelyn Marie Perez, Winchester (GB); Timothy Andrew Moran, Southampton (GB); Eric John Bartlett, Chard (GB); Miles Mulholland, Eastleigh (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 18/754,491

(22) Filed: Jun. 26, 2024

(65) Prior Publication Data

US 2025/0383803 A1 Dec. 18, 2025

(30) Foreign Application Priority Data

Jun. 18, 2024 (GB) ...................................... 2408726

(51) Int. Cl.
*G06F 3/06* (2006.01)
(52) U.S. Cl.
CPC .......... *G06F 3/0635* (2013.01); *G06F 3/0611* (2013.01); *G06F 3/067* (2013.01)
(58) Field of Classification Search
None
See application file for complete search history.

(56) References Cited

U.S. PATENT DOCUMENTS

| | | | |
|---|---|---|---|
| 11,429,495 | B2 | 8/2022 | Tomkins |
| 2019/0356729 | A1 | 11/2019 | Bivens |
| 2020/0326881 | A1 | 10/2020 | Wozniak |
| 2022/0188028 | A1 | 6/2022 | Mesnier |
| 2022/0318206 | A1 | 10/2022 | Prahlad |

(Continued)

OTHER PUBLICATIONS

"Computational Storage Architecture and Programming Model", Aug. 30, 2022, Version 1.0, SNIA Standard, 71 pps.

(Continued)

*Primary Examiner* — Brian R Peugh
(74) *Attorney, Agent, or Firm* — Aaron N. Pontikos

(57) ABSTRACT

A computer-implemented method, computer program product, and computer system for managing computational storage operations. The computer-implemented method includes receiving a computational storage operation at a storage controller and inspecting the computation storage operation to determine a type of operation. The computer-implemented method further includes leveraging metadata of the storage controller to identify possible offload locations on storage devices for handling the computational storage operation of the determined type. The computer-implemented method further includes inspecting a register of storage devices maintained with the computational capabilities of the storage devices to determine which of the identified storage devices can support the computational storage operation to obtain candidate storage devices. The computer-implemented method further includes comparing the candidate storage devices using an estimated computational storage latency metric to select a storage device for handling the computational storage operation.

18 Claims, 5 Drawing Sheets

100

RECEIVE COMPUTATIONAL STORAGE OPERATION 101

INSPECT THE RECEIVED OPERATION TO DETERMINE TYPE OF OPERATION 102

LEVERAGE STORAGE CONTROLLER METADATA TO DETERMINE OFFLOAD LOCATIONS AT POSSIBLE STORAGE DEVICES 103

INSPECT REGISTER TO DETERMINE STORAGE DEVICE CAPABILITIES TO RESULT IN CANDIDATE STORAGE DEVICES 104

FILTER BASED ON STORAGE DEVICES HAVING SPARE COMPUTE RESOURCES 105

ESTIMATE COMPUTATIONAL STORAGE LATENCY METRIC FOR EACH CANDIDATE STORAGE DEVICE 106

COMPARE AND SELECT ONE OR MORE STORAGE DEVICE BASED ON THE METRIC 107

SEND THE OPERATION TO THE SELECTED STORAGE DEVICE AND COPYING RESULTS BACK TO ORIGINAL STORAGE OBJECT 108

(56) References Cited

U.S. PATENT DOCUMENTS

| | | | |
|---|---|---|---|
| 2022/0342601 A1* | 10/2022 | Daoud | ................... G06F 3/067 |
| 2023/0099831 A1 | 3/2023 | Soltaniyeh et al. | |
| 2023/0112338 A1 | 4/2023 | Mulholland | |
| 2023/0359591 A1 | 11/2023 | Dubeyko et al. | |
| 2023/0361944 A1 | 11/2023 | Ki | |
| 2024/0143517 A1 | 5/2024 | Ramanathan et al. | |

OTHER PUBLICATIONS

GB Patent Application No. 2408726.4 filed Jun. 18, 2024.
Intellectual Property Office, Patents Act 1977: Search Report under Section 17(5), Oct. 30, 2024, 3 Pages, GB Application No. 2408726. 4.

* cited by examiner

100

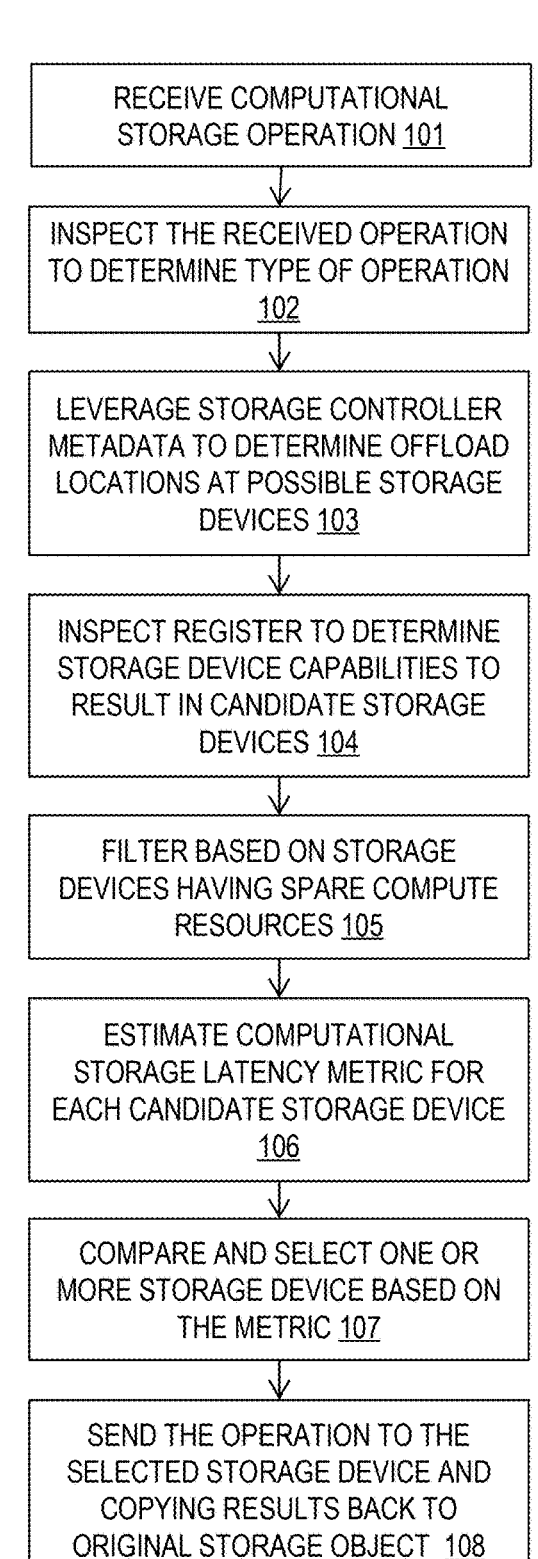

RECEIVE COMPUTATIONAL STORAGE OPERATION 101

INSPECT THE RECEIVED OPERATION TO DETERMINE TYPE OF OPERATION 102

LEVERAGE STORAGE CONTROLLER METADATA TO DETERMINE OFFLOAD LOCATIONS AT POSSIBLE STORAGE DEVICES 103

INSPECT REGISTER TO DETERMINE STORAGE DEVICE CAPABILITIES TO RESULT IN CANDIDATE STORAGE DEVICES 104

FILTER BASED ON STORAGE DEVICES HAVING SPARE COMPUTE RESOURCES 105

ESTIMATE COMPUTATIONAL STORAGE LATENCY METRIC FOR EACH CANDIDATE STORAGE DEVICE 106

COMPARE AND SELECT ONE OR MORE STORAGE DEVICE BASED ON THE METRIC 107

SEND THE OPERATION TO THE SELECTED STORAGE DEVICE AND COPYING RESULTS BACK TO ORIGINAL STORAGE OBJECT 108

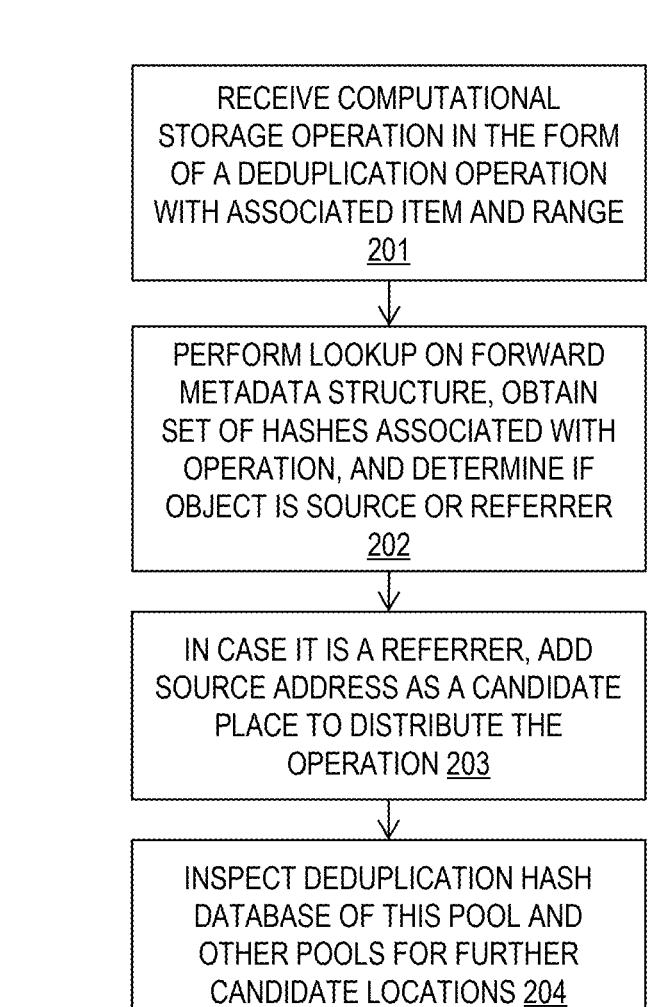

RECEIVE COMPUTATIONAL STORAGE OPERATION IN THE FORM OF A DEDUPLICATION OPERATION WITH ASSOCIATED ITEM AND RANGE 201

PERFORM LOOKUP ON FORWARD METADATA STRUCTURE, OBTAIN SET OF HASHES ASSOCIATED WITH OPERATION, AND DETERMINE IF OBJECT IS SOURCE OR REFERRER 202

IN CASE IT IS A REFERRER, ADD SOURCE ADDRESS AS A CANDIDATE PLACE TO DISTRIBUTE THE OPERATION 203

INSPECT DEDUPLICATION HASH DATABASE OF THIS POOL AND OTHER POOLS FOR FURTHER CANDIDATE LOCATIONS 204

INSPECT FOR ASSOCIATED REPLICATED VOLUMES, MIRRORS, AND SNAPSHOTS 205

COMPUTATIONAL STORAGE OPERATION
LBA: 0X014210
VOLUME: KITTENS
RANGE: 0X1
OPERATION: IMAGE PROCESSING 301

DEDUPLICATION REFERRAL 310

| | | |
|---|---|---|
| LBA: 0X014210 VOLUME: KITTENS HASH: 0XABCDEF 311 | LBA: 0X049212 VOLUME: CATS HASH: 0XABCDEF 312 | COMPUTATIONAL STORAGE BACKED ARRAY 1 313 |

DEDUPLICATION HASH MATCH 320

LBA: 0X014210
VOLUME: KITTENS
HASH: 0XABCDEF 311

POOL 1
HASH: 0XABCDEF VOLUME: CUTE ANIMALS
LBA: 0X45124
322

COMPUTATIONAL STORAGE BACKED ARRAY 2 324

POOL 2
HASH: 0XABCDEF VOLUME: ADORABLE THINGS
LBA: 0X94190
323

COMPUTATIONAL STORAGE BACKED ARRAY 3 325

MIRRORING/REPLICATION 330

CLUSTER 1 331
CATS 332

CLUSTER 2 333
CATS 334

COMPUTATIONAL STORAGE BACKED ARRAY 4 335

SNAPSHOTS 340

CLUSTER 2 341
CATS 334 → CATS SNAPSHOT 343

COMPUTATIONAL STORAGE BACKED ARRAY 5 345

*FIG. 3*

MANAGING COMPUTATIONAL STORAGE OPERATIONS

BACKGROUND

The present invention relates to computational storage operations, and more specifically, to managing computational storage operations to optimize computational storage.

Computational storage is a technique where storage devices have additional compute capabilities associated with them. This can be used for compression or deduplication operations, but also allows for more sophisticated approaches. One use case may be to perform database operations against locally stored components of a table to negate the need to stage the data into a server and process it there. The presence of compute capabilities on the storage devices allows for operations against the data which would previously be non-viable for a storage controller to perform.

Thin provisioning is a concept where storage does not wholly allocate the advertised capacity. Storage is only allocated when it must be used. All block, file, and object storage systems have equivalents of this. Object and file systems are effectively thin provisioned by their nature (objects and files can only be allocated upon creation), and block storage systems can have thin provisioning implemented using a forward lookup structure to map allocated ranges to the physical storage medium. Storage can either be kept local to a volume or pooled between multiple volumes. Thin provisioning allows the implementation of advanced space saving techniques, such as compression and deduplication, as one need only update the forward lookup structure with the appropriate details (for example, whether it is compressed, or a reference to a different grain).

Deduplication operates by having an in-memory lookup table to contain partial hashes of recent writes. An incoming IO operation will first perform a hash, using an algorithm like SHA-1 or SHA-256. That hash will then be compared against the lookup table to determine if there is a match in the system for this IO operation. If there is a potential match, a lookup is performed to determine if the full hash is located in the storage system. If it is, a reference is created for the virtual address and volume being written to that references the potential match's location.

SUMMARY

According to an aspect of the present invention, there is provided a computer-implemented method for managing computational storage operations, the method comprising: receiving a computational storage operation at a storage controller; inspecting the computational storage operation to determine a type of operation; leveraging metadata of the storage controller to identify possible offload locations on storage devices for handling the computational storage operation of the determined type; inspecting a register of storage devices maintained with the computational capabilities of the storage devices to determine which of the identified storage devices can support the computational storage operation to obtain candidate storage devices; and comparing the candidate storage devices using an estimated computational storage latency metric to select a storage device for handling the computational storage operation.

According to another aspect of the present invention, there is provided a system for managing computational storage operations, comprising: a processor and a memory configured to provide computer program instructions to the processor to execute a method of: receiving a computational storage operation at a storage controller; inspecting the computational storage operation to determine a type of operation; leveraging metadata of the storage controller to identify possible offload locations on storage devices for handling the computational storage operation of the determined type; inspecting a register of storage devices maintained with the computational capabilities of the storage devices to determine which of the identified storage devices can support the computational storage operation to obtain candidate storage devices; and comparing the candidate storage devices using an estimated computational storage latency metric to select a storage device for handling the computational storage operation.

According to a further aspect of the present invention, there is provided a computer program product for managing computational storage operations, the computer program product comprising: a computer readable storage medium having program instructions embodied therewith, the program instructions executable by a processor to cause the processor to: receive a computational storage operation at a storage controller; inspect the computational storage operation to determine a type of operation; leverage metadata of the storage controller to identify possible offload locations on storage devices for handling the computational storage operation of the determined type; inspect a register of storage devices maintained with the computational capabilities of the storage devices to determine which of the identified storage devices can support the computational storage operation to obtain candidate storage devices; and compare the candidate storage devices using an estimated computational storage latency metric to select a storage device for handling the computational storage operation.

BRIEF DESCRIPTION OF THE DRAWINGS

Embodiments of the present invention will now be described, by way of example only, with reference to the accompanying drawings.

FIG. 1 is a flow diagram of an example embodiment of a method in accordance with embodiments of the present invention.

FIG. 2 is a flow diagram of an example embodiment of an aspect of a method in accordance with embodiments of the present invention.

FIG. 3 is a schematic diagram showing possible storage devices in accordance with embodiments of the present invention.

Figure 4:
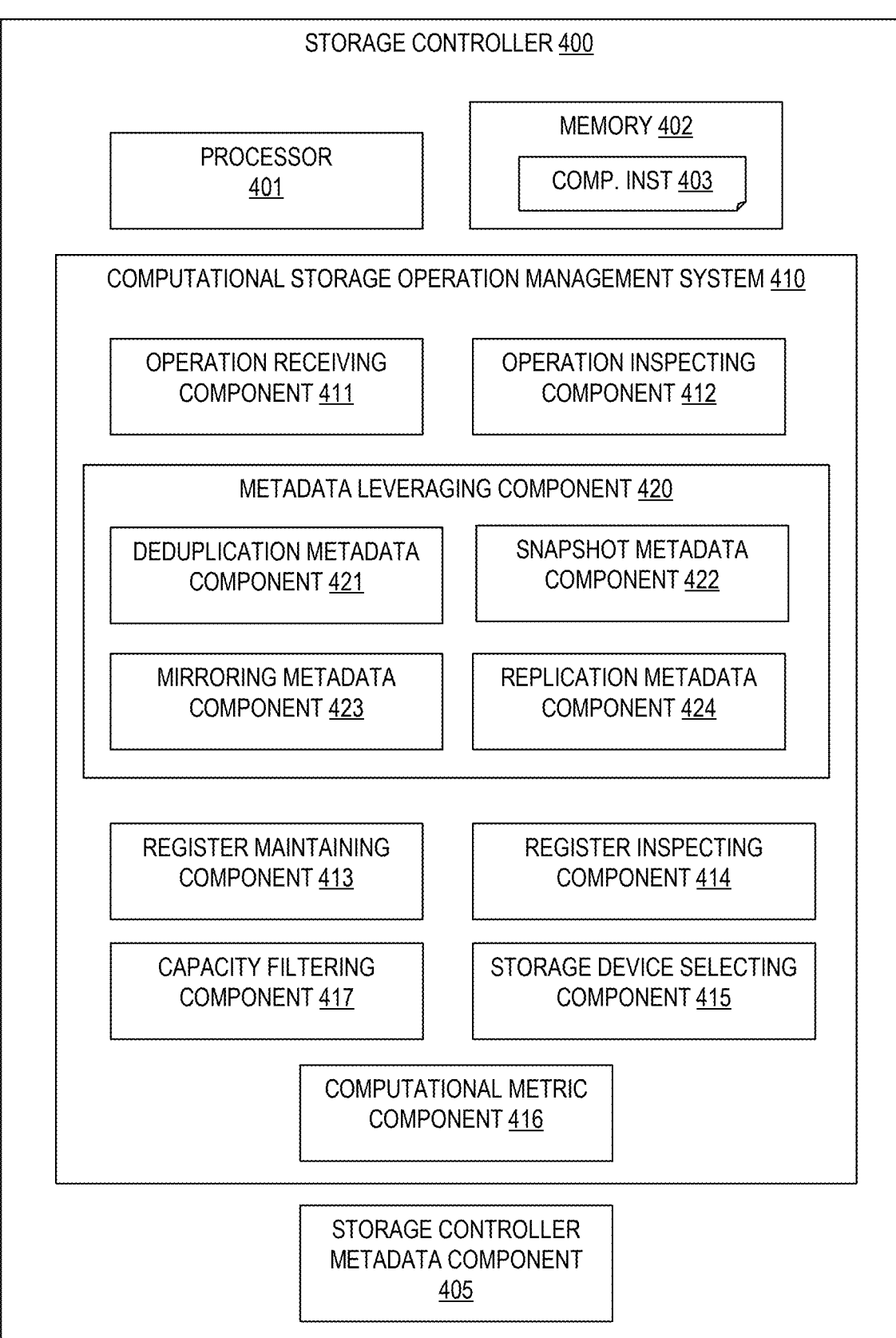
FIG. 4 is a block diagram of an example embodiment of a system in accordance with embodiments of the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION

Embodiments of the present invention provide for a method, system, and computer program product for managing computational storage operations to distribute computational storage operations received at a storage controller to other storage devices having processing capability. The described embodiments relate to an improvement in the technical field of computer storage. According to embodiments of the present invention, existing metadata of a storage system is used to discover other locations which can perform a same computational operation in a more capable fashion. This may be due to the other locations being at storage devices that have more capable hardware or less overloaded storage.

Computational storage operations may include the following operations: compression, database filter, encryption, erasure coding, regular expression, scatter-gather, pipeline, video compression, hash, cyclic redundancy check, data deduplication, large data set, threat detection, etc. Computational storage operations can be performed against storage items in the form of logical block addresses (LBAs), files, or objects. A storage device has processing capability and may be any device that could be a target capable of computational storage. A storage device may be a hardware storage device including a storage controller, computational storage device (for example, high performance flash drives), etc.

In a system implementing computational storage, metadata of a storage system can be leveraged to discover other locations which can perform the same operation but potentially in a more capable fashion. This may be due to the other locations being at storage devices that have more capable hardware or less overloaded storage. Based on this, computational storage operations can be redirected to these locations on storage devices, thereby gaining additional bandwidth and reducing latency. Given that these operations can be of longer duration and computationally expensive, leveraging the knowledge of the storage system to distribute them results in beneficial performance. This is particularly the case where storage devices are identified that have hardware that optimally matches an operation in question or that is less overloaded.

Referring to FIG. 1, a flow diagram 100 shows an example embodiment of a method for handling computational storage operations carried out by a storage controller.

The method receives 101 a computational storage operation indicating that some computation needs to be performed on stored data. The method inspects 102 the received operation to determine what type of computational storage operation it is. For example, this may result in the identification of a deduplication operation, a compression operation, a database operation, etc.

The method leverages 103 metadata of the storage controller to identify possible offload locations on storage devices for handling the computational storage operation of the determined type. Offload locations refer to regions of storage capacity that have the same data to send an operation to. The metadata may, for example, relate to deduplication, snapshots, mirroring, replication, or any combination thereof. The possible offload locations at storage devices may be, for example, a source deduplication address, locations in other pools, locations of replicated volumes, mirrors or snapshots, or any combination thereof.

For example, in the case of a deduplication operation, the method may leverage the deduplication metadata at the storage controller. Leveraging deduplication metadata of a target object may include carrying out a lookup for operation hashes in in-memory hash lookup tables, deduplicating caches, storage systems accepting hash lookups, or any combination thereof. Based on this, the associated object and volume may be obtained, and thus their associated mirrors and snapshots, which may be used as possible storage devices.

In another example, the method may leverage snapshot metadata for a target object to determine snapshot objects associated with the target object which may be possible storage devices. In a further example, the method may leverage replication metadata for determining possible replication storage devices as possible storage devices. In yet a further example, the method may leverage mirror metadata to identify a mirror as a possible candidate storage device.

These approaches may be applied recursively. For example, a lookup using deduplicated hashes may be performed, as well as a review of the set of volumes and addresses associated with the snapshots of the addresses associated with the deduplication hash databases.

The method may inspect 104 a register of storage devices maintained with the computational capabilities of the storage devices to determine which of the identified storage devices can support the computational storage operation to obtain a subset of candidate storage devices. The register may also be referred to herein as a register of storage devices or a capabilities register.

The register of storage devices may be maintained by, at the time of storage device discovery, querying whether the storage device is capable of performing each of multiple types of computational storage operations and querying the storage device for a measure of how performant the storage device is for the type of storage operation. Maintaining the register of storage devices may include registering the computational capabilities of each computational storage device in a network such that any computational storage device in the network can inspect what its peer storage device capabilities are.

Inspecting 104 the register includes determining which of the identified storage devices (including the originally intended storage device of the computational operation) can support the received computational storage operation based on the compute capabilities of the storage devices, since each storage device may have different computational capabilities. This provides a process for matching storage operations to storage device capabilities. Thus, having identified operations that could benefit from computational storage, the process matches the identified operations to the storage devices that offer the appropriate capabilities.

The method may filter 105 the storage devices based on current resource capacity. The filtering may be carried out by including a current resource capacity in the register of storage devices such that this is filtered when inspecting 104 the register.

The method may estimate 106 a computational storage latency metric for each candidate storage device determined from the register. In an embodiment, estimating 106 a computational storage latency metric for a storage device may be carried out by sending a description of the computational storage operation to the storage device and asking the storage device to provide an estimate of how long it would take to process the operation. In an embodiment, estimating 106 a computational storage latency metric for a storage device may be alternatively or additionally carried out by periodically actively monitoring the storage device performance with known operations to gauge the storage device processing capabilities.

The estimated computational storage latency metric may be based on a measure of how long the computational operation is expected to take plus a transmission time between the storage controller and the storage device. In an embodiment, the estimated computational storage latency metric may also include an estimated latency associated with performing subsequent writes associated with the output of a computational storage operation when the operation is a mutable operation.

The estimated computational storage latency metric may be:

$$\text{Estimated latency} = computational\_storage\_latency(target) + $$

$$transmission\_latency(source, target) + $$

$$if\_mutable\_operation\_write\_latency(source).$$

Computational_storage_latency is a function of how long the compute operation is expected to take. This estimate may vary based on the operation being performed. This may be estimated based on prior executions of the operation or through knowledge of the underlying hardware's capabilities. For example, if one storage controller is supporting a compression operation with compression hardware accelerators, the computational storage latency may be in microseconds; otherwise, the computational storage latency may be in milliseconds if implemented in software.

Transmission_latency accounts for round trip time between the local storage controller and a candidate remote storage device.

If_mutable_operation_write_latency (source) accounts for the latency associated with performing a subsequent write associated with the output of a computational storage operation.

The latency calculation may be made more sophisticated, for example, by accounting for write bandwidth, transmission bandwidth, etc.

The estimated computational storage latency is a function of how well the capabilities of the computational storage device match the characteristics of the storage operation.

The method may compare 107 the candidate storage devices using the estimated computational storage latency metric to select one or more storage devices for handling the received computational storage operation. A storage controller performing this process may itself be chosen as a candidate storage device.

The method may send 108 the computational storage operation for performance by the one or more selected candidate storage devices, and copy the results of the computational storage operation back to the original storage object, if applicable. In an embodiment, the method may distribute a workload of a computational operation by splitting it across storage devices at multiple appropriate locations.

The method applies functionality that is possible when implemented in a storage controller to leverage the storage controller metadata to obtain possible offload locations at other storage devices. As the method may be implemented by a storage controller, it can identify and match storage operations (for example, deduplication, snapshots, replication) to those computational storage devices that best support them.

It should be appreciated that since conventional methods are concerned with finding the most efficient location to route a computational request based purely on data availability and the current utilization of a location, conventional methods are not concerned with finding the types of storage operations that would benefit from computational storage capabilities at that location.

Referring to FIG. 2, a flow diagram 200 shows an example embodiment of an aspect of the described method in which the received 201 computational storage operation is a deduplication operation associated with a storage item and range, and leverages deduplication metadata.

The method may perform 202 a lookup on a forward metadata structure to obtain a set of hashes associated with the computational storage operation and to determine if the storage item is a source or a referrer item. In the case that the storage item is a referrer, the method may add 203 a source address as a possible offload location on storage devices.

The method may inspect 204 a deduplication hash database of a current pool and other pools for possible offload locations on storage devices. In an embodiment, the method may also inspect 205 for any associated replicated volumes, mirror, or snapshots as additional offload locations on storage devices.

The storage devices of the possible offload locations may be checked for capabilities and capacity using the register to obtain a subset of candidate storage devices for distributing the computational storage operation to.

Referring to FIG. 3, a schematic diagram 300 illustrates an example of the process of FIG. 2. A computational storage operation 301 may have an LBA at a volume "kittens" with a given range for a type of computational operation of image processing.

A deduplication referral 310 lookup finds that the data references the volume "cats". The deduplication reference 311 of the LBA at volume "kittens" with hash 0xabcdef references 312 with an LBA at volume "cats" with the hash 0xabcdef that is stored on a computational storage backed array 1 313.

Additional pools that do not store the volume "kittens" have their hash databases inspected to find a match for the hash 0xabcdef. These are additional pools that do not store the original "kittens" volume, but contain the same data. This deduplication hash match 320 finds matches in pool 1 322 stored on a computational storage backed array 2 324 and pool 2 323 stored on a computational storage backed array 3 325.

As the volume "cats" is considered valuable, it has mirrors 330. The volume 332 is stored on cluster 1 331 and a mirror volume 334 with a replication relationship on cluster 2 333 is stored on a computational storage backed array 4 335.

A snapshot 340 of the volume "cats" 334 on cluster 2 341 has been taken as volume "cats" snapshot 343 also on cluster 2 341. The snapshot is a background copy that has occurred and the bitmap indicates that the data is unchanged. The snapshot volume 343 is stored on computational storage backed array 5 345.

This results in five possible storage devices in the form of the computational storage backed arrays 1-5 313, 324, 325, 335, 345 that can be checked in the register of storage devices. The register check finds the following capabilities and current load.

Computational storage backed array 1 313 has an image processing accelerator and load=95%. Computational storage backed array 2 324 does not have an image processing accelerator and load=15%. Computational storage backed array 3 325 has an image processing accelerator and load=15%. Computational storage backed array 4 335 does not have an image processing accelerator and load=9%. Computational storage backed array 5 345 has an image processing accelerator and load=3%.

A result is that the computational storage operation 301 is submitted to snapshot volume "cats" 343 on computational storage backed array 5 345 on cluster 2 341, rather than to the original volume "kitten". The computational storage backed array 5 345 has hardware accelerators and a lower load that makes it capable with capacity to perform the operation and preferable to the original volume. This is a simplified selection that does not take into account the transmission latency to cluster 2 333.

When a computational storage operation is received for an object, a set of candidate locations at which to perform the operation can be determined. These include the following paths, documented in brief here.

The following describes an aspect of the invention for identifying possible storage devices using the storage controller metadata. These approaches may be applied recursively. For example, a lookup using deduplicated hashes may be performed, and then a review of the set of volumes and addresses associated with the snapshots of the addresses associated with the deduplication hash databases. It should be appreciated that although the method is described below in relation to object storage, equivalent methods in relation to block storage or file storage may be provided.

Deduplication

Upon receipt of an operation against an object, a lookup operation is performed to find the ultimate destination address of the IO operation. From this lookup, the associated hashes for data in question may be exposed, as this metadata is present in a deduplicating storage system. Based on this, a lookup for these hashes may be performed in in-memory hash lookup tables, deduplicating caches, and storage systems accepting hash lookups. The associated mirrors and snapshots of the referenced volume can be used as distribution candidates.

Based on this, it is possible to find alternative candidate storage sources for the data in question. The computational storage operation may then be performed against those discovered ranges, so long as the operation does not mutate the underlying storage. Database lookups may be an example of an operation which would benefit from this. Similarly, mutation may be allowed so long as the end-result is copied to the desired destination.

Snapshots

For a given storage object, there may be snapshot objects associated with it. These snapshots may have significant ranges which are common with the original object. Many object storage systems follow an immutable model, but for filesystems and block storage, this technique is notable.

For snapshots, a determination needs to be made whether the snapshot is functionally equivalent to the original object. If, for example, the snapshot differs merely by metadata, it may be considered equivalent if the computational storage operation relies solely on the underlying data.

In the case of block storage, the snapshot bitmap may be maintained to determine if an object is equivalent. In the case of object and file storage, something as simple as a SHA-1 hash could be leveraged to confirm equivalent underlying data. The benefit realized here is that it is possible to rapidly search a set of likely similar files (i.e. the snapshots) from the underlying storage system metadata, as opposed to searching the whole domain.

Replication Partnerships

If a system is subject to replication, it may be possible to direct the computational storage operation to one of the other storage systems associated with the replication relationship. Some intelligence may be required here to determine if the copy on the remote site is up-to-date (for example, contemplation of the freeze-state of the object), which can be trivially done.

In the case of active-active replication, active-passive replication, and mirroring, the workload may be distributed to the mirror volumes. These volumes may be implemented on hardware which have advantageous characteristics for computational storage purposes. These may be possible storage devices to be added to the set of possible destinations for the operation. In the case of replication, in order to distribute the workload efficiently, the inter-cluster link overhead must be factored in.

Upon identifying possible destinations and addresses, the capabilities of the underlying storage devices are inspected for computational storage operations, and the relative load of that hardware. From this, an optimal destination is selected to distribute the workload.

The register of the storage devices may include an indication of whether the storage device has certain hardware accelerated media encoders, the capabilities of the device in terms of what Storage Networking Industry Association (SNIA) defined operations it supports, performance benchmarks for known reference workloads under those specifications, or any combination thereof.

A computational storage device may also indicate to the register what its current load is. Since the storage devices are computation units, it is possible to determine what percentage of their processors are considered idle. Regular polling may be sufficient to indicate the current load (or the load over a last defined period of time) associated with the device. For architectures implementing computational storage leveraging technologies such as graphical processing units (GPUs), this is typically trivially available from the device driver. Samples from application programming interfaces (APIs) such as this may be bucketed to give utilization-over-time statistics which can be leveraged to determine current load on a computational storage device.

Details regarding current utilization may be combined with the capabilities register to allow for the identified storage devices to be evaluated. The capabilities register may be implemented on the local storage controller itself or as an external service.

Consideration of immutable operations versus mutable operations resulting in changes to the state may require the end product to be copied from the candidate computation site to the original target, and this should be factored into the cost of candidate storage device selection. However, this does not restrict mutable operations from benefiting from aspects of the present invention. Given that computational storage is widely applicable to object storage, many of these operations assume that a new object is being created anyway or that the results are simply being returned.

In the case of operations requiring a copy operation to be performed at the end of the operation, the register of storage devices may be extended to allow querying a per-controller latency/bandwidth number and utilization figure, to allow the process to attempt to calculate the transmission cost of performing the operation on the specified storage device, as opposed to locally.

The described method and system of aspects of the present invention have the ability to distribute computational storage operations in a virtualization storage controller or a multi-system storage configuration beyond simple mirrored volumes. This is particularly advantageous compared to conventional storage operations, as there may be a great deal of variance between compute capable hardware and time to execute computational storage operations. Furthermore, leveraging a virtualization storage controller to distribute computational storage operations beyond simple mirrored volumes allows for improved latency and bandwidth for these operations.

Referring to FIG. 4, a block diagram shows an example embodiment of a computer system in the form of a storage controller 400 in which the described system for computational storage operation management 410 may be implemented. The storage controller 400 may include at least one processor 401, a hardware module, or a circuit for executing the functions of the described components which may be software units executing on the at least one processor. Multiple processors running parallel processing threads may be provided, enabling parallel processing of some or all of the functions of the components. Memory 402 may be configured to provide computer instructions 403 to the at least one processor 401 to carry out the functionality of the components.

The computational storage operation management system 410 may include the following components in the form of software modules for carrying out the described functionality. An operation receiving component 411 may be provided for receiving a computational storage operation at a storage controller and an operation inspecting component 412 may be provided for inspecting the computation storage operation to determine a type of operation.

A metadata leveraging component 420 may be provided for leveraging metadata 405 of the storage controller 400 to identify possible offload locations on storage devices for handling the computational storage operation of the determined type. The metadata leveraging component 420 may include a deduplication metadata component 421, a snapshot metadata component 422, a mirroring metadata component 423, a replication metadata component 424, or any combination thereof.

The deduplication metadata component 421 leverages deduplication metadata of a computational storage operation with an associated storage item and may carry out the following operations: perform a lookup on a forward metadata structure to determine if the storage item is a source or a referrer item; when a referrer, identify a source address and any associated replications, mirrors, or snapshots as possible offload locations on storage devices; and inspect a deduplication hash database of current pool and other pools for possible offload locations on storage devices.

The snapshot metadata component 422 leverages snapshot metadata of a computational storage operation with an associated storage item and may carry out the following operations: determine that a snapshot has been taken of the associated storage item and that the data is unchanged; and identify the snapshot location as a possible offload location on a storage device.

The mirroring metadata component 423 and a replication metadata component 424 may leverage respective mirroring or replication metadata of a computational storage operation with an associated storage item and may carry out the following operations: determine that a mirror or replication of the associated storage item exists; and identify the mirror or replication location as a possible offload location on a storage device.

A register maintaining component 413 may be provided for maintaining a register of storage devices by, at the time of storage device discovery, querying whether the storage device is capable of performing each of multiple types of computational storage operations, and querying the storage device for a measure of how performant the storage device is for the type of storage operation. The register maintaining component 413 may register the computational capabilities of each computational storage device in a network, such that any computational storage device in the network can inspect what its peer storage device capabilities are.

A register inspecting component 414 may be provided for inspecting a register of storage devices maintained with the computational capabilities of the storage devices to determine which of the identified storage devices can support the computational storage operation to obtain candidate storage devices. A capacity filtering component 417 may be provided for filtering the storage devices based on current resource capacity.

A storage device selecting component 415 may be provided for comparing the candidate storage devices using an estimated computational storage latency metric to select a storage device for handling the computational storage operation.

A computational metric component 416 may be provided for determining the estimated computational storage latency metric based on a measure of how long the computational operation is expected to take plus a transmission time between the storage controller and the storage device.

The computational metric component 416 may determine the estimated computational storage latency metric, including an estimated latency associated with performing subsequent writes associated with the output of a computational storage operation when the operation is a mutable operation.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 5:
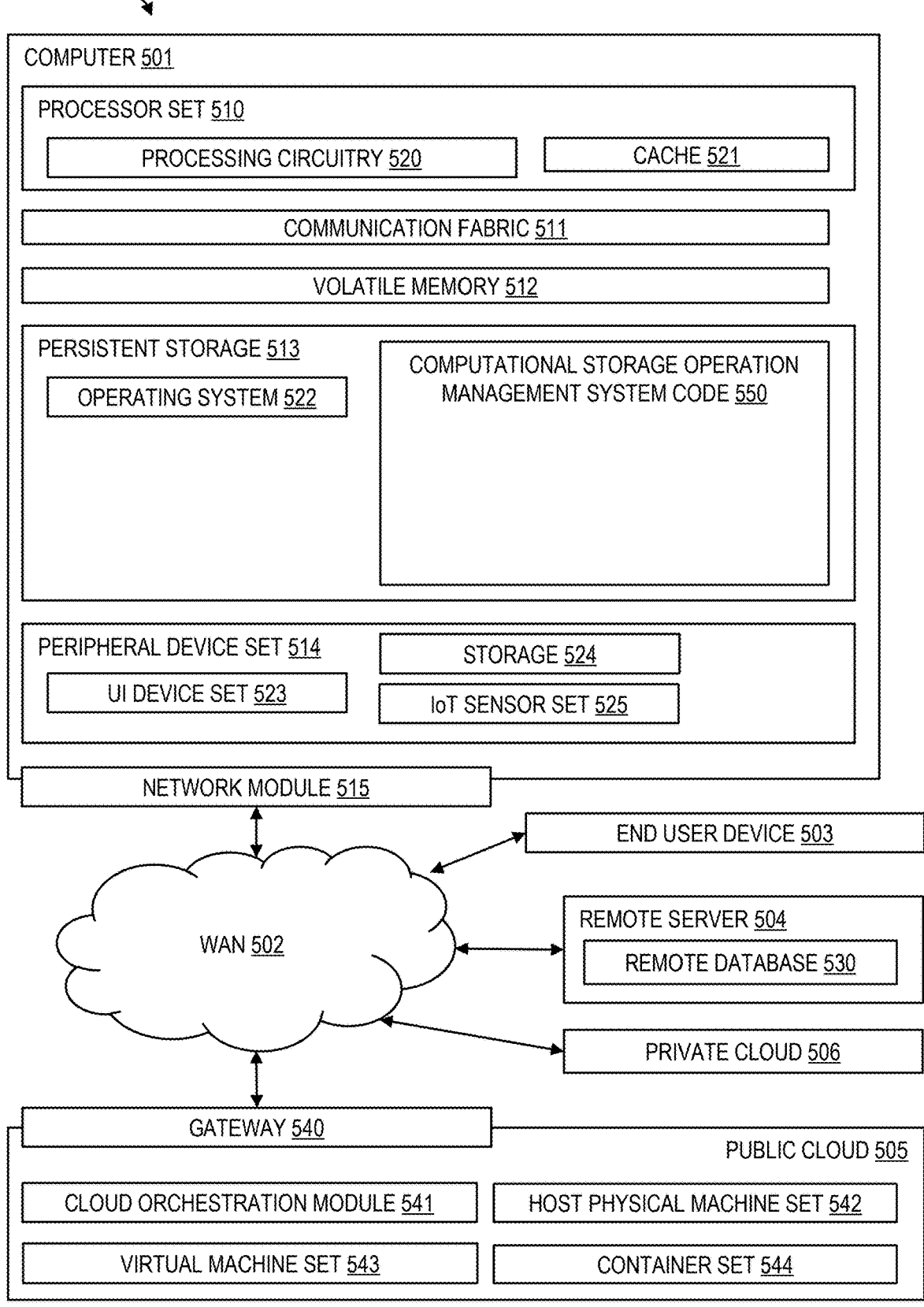
FIG. 5 is a block diagram of an example embodiment of a computing environment for the execution of at least some of the computer code involved in performing the present invention.

Referring to FIG. 5, computing environment 500 contains an example of an environment for the execution of at least some of the computer code involved in performing the inventive methods, such as computational storage operation management system code 550. In addition to block 550, computing environment 500 includes, for example, computer 501, wide area network (WAN) 502, end user device (EUD) 503, remote server 504, public cloud 505, and private cloud 506. In this embodiment, computer 501 includes processor set 510 (including processing circuitry 520 and cache 521), communication fabric 511, volatile memory 512, persistent storage 513 (including operating system 522 and block 550, as identified above), peripheral device set 514 (including user interface (UI) device set 523, storage 524, and Internet of Things (IOT) sensor set 525), and network module 515. Remote server 504 includes remote database 530. Public cloud 505 includes gateway 540, cloud orchestration module 541, host physical machine set 542, virtual machine set 543, and container set 544.

COMPUTER 501 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 530. As is well understood in the art of computer technology, and depending upon the technology, performance of a computer-implemented method may be distributed among multiple computers and/or between multiple locations. On the other hand, in this presentation of computing environment 500, detailed discussion is focused on a single computer, specifically computer 501, to keep the presentation as simple as possible. Computer 501 may be located in a cloud, even though it is not shown in a cloud in FIG. 5. On the other hand, computer 501 is not required to be in a cloud except to any extent as may be affirmatively indicated.

PROCESSOR SET 510 includes one, or more, computer processors of any type now known or to be developed in the future. Processing circuitry 520 may be distributed over multiple packages, for example, multiple, coordinated integrated circuit chips. Processing circuitry 520 may implement multiple processor threads and/or multiple processor cores. Cache 521 is memory that is located in the processor chip package(s) and is typically used for data or code that should be available for rapid access by the threads or cores running on processor set 510. Cache memories are typically organized into multiple levels depending upon relative proximity to the processing circuitry. Alternatively, some, or all, of the cache for the processor set may be located "off chip." In some computing environments, processor set 510 may be designed for working with qubits and performing quantum computing.

Computer readable program instructions are typically loaded onto computer 501 to cause a series of operational steps to be performed by processor set 510 of computer 501 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 521 and the other storage media discussed below. The program instructions, and associated data, are accessed by processor set 510 to control and direct performance of the inventive methods. In computing environment 500, at least some of the instructions for performing the inventive methods may be stored in block 550 in persistent storage 513.

COMMUNICATION FABRIC 511 is the signal conduction path that allows the various components of computer 501 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 512 is any type of volatile memory now known or to be developed in the future. Examples include dynamic type random access memory (RAM) or static type RAM. Typically, volatile memory 512 is characterized by random access, but this is not required unless affirmatively indicated. In computer 501, the volatile memory 512 is located in a single package and is internal to computer 501, but, alternatively or additionally, the volatile memory may be distributed over multiple packages and/or located externally with respect to computer 501.

PERSISTENT STORAGE 513 is any form of non-volatile storage for computers that is now known or to be developed in the future. The non-volatility of this storage means that the stored data is maintained regardless of whether power is being supplied to computer 501 and/or directly to persistent storage 513. Persistent storage 513 may be a read only memory (ROM), but typically at least a portion of the persistent storage allows writing of data, deletion of data and re-writing of data. Some familiar forms of persistent storage include magnetic disks and solid-state storage devices. Operating system 522 may take several forms, such as various known proprietary operating systems or open-source Portable Operating System Interface-type operating systems that employ a kernel. The code included in block 550 typically includes at least some of the computer code involved in performing the inventive methods.

PERIPHERAL DEVICE SET 514 includes the set of peripheral devices of computer 501. Data communication connections between the peripheral devices and the other components of computer 501 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 523 may include components such as a display screen, speaker, microphone, wearable devices (such as goggles and smart watches), keyboard, mouse, printer, touchpad, game controllers, and haptic devices. Storage 524 is external storage, such as an external hard drive, or insertable storage, such as an SD card. Storage 524 may be persistent and/or volatile. In some embodiments, storage 524 may take the form of a quantum computing storage device for storing data in the form of qubits. In embodiments where computer 501 is required to have a large amount of storage (for example, where computer 501 locally stores and manages a large database) then this storage may be provided by peripheral storage devices designed for storing very large amounts of data, such as a storage area network (SAN) that is shared by multiple, geographically distributed computers. IoT sensor set 525 is made up of sensors that can be used in Internet of Things applications. For example, one sensor may be a thermometer and another sensor may be a motion detector.

NETWORK MODULE 515 is the collection of computer software, hardware, and firmware that allows computer 501 to communicate with other computers through WAN 502. Network module 515 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 515 are performed on the same physical hardware device. In other embodiments (for example, embodiments that utilize software-defined networking (SDN)), the control functions and the forwarding functions of network module 515 are performed on physically separate devices, such that the control functions manage several different network hardware devices. Computer readable program instructions for performing the inventive methods can typically be downloaded to computer 501 from an external computer or external storage device through a network adapter card or network interface included in network module 515.

WAN 502 is any wide area network (for example, the internet) capable of communicating computer data over non-local distances by any technology for communicating computer data, now known or to be developed in the future. In some embodiments, the WAN 502 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 503 is any computer system that is used and controlled by an end user (for example, a customer of an enterprise that operates computer 501), and may take any of the forms discussed above in connection with computer 501. EUD 503 typically receives helpful and useful data from the operations of computer 501. For example, in a hypothetical case where computer 501 is designed to provide a recommendation to an end user, this recommendation would typically be communicated from network module 515 of computer 501 through WAN 502 to EUD 503. In this way, EUD 503 can display, or otherwise present, the recommendation to an end user. In some embodiments, EUD 503 may be a client device, such as thin client, heavy client, mainframe computer, desktop computer and so on.

REMOTE SERVER 504 is any computer system that serves at least some data and/or functionality to computer 501. Remote server 504 may be controlled and used by the same entity that operates computer 501. Remote server 504 represents the machine(s) that collect and store helpful and useful data for use by other computers, such as computer 501. For example, in a hypothetical case where computer 501 is designed and programmed to provide a recommendation based on historical data, then this historical data may be provided to computer 501 from remote database 530 of remote server 504.

PUBLIC CLOUD 505 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 505 is performed by the computer hardware and/or software of cloud orchestration module 541. The computing resources provided by public cloud 505 are typically implemented by virtual computing environments that run on various computers making up the computers of host physical machine set 542, which is the universe of physical computers in and/or available to public cloud 505. The virtual computing environments (VCEs) typically take the form of virtual machines from virtual machine set 543 and/or containers from container set 544. It is understood that these VCEs may be stored as images and may be transferred among and between the various physical machine hosts, either as images or after instantiation of the VCE. Cloud orchestration module 541 manages the transfer and storage of images, deploys new instantiations of VCEs and manages active instantiations of VCE deployments. Gateway 540 is the collection of computer software, hardware, and firmware that allows public cloud 505 to communicate through WAN 502.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 506 is similar to public cloud 505, except that the computing resources are only available for use by a single enterprise. While private cloud 506 is depicted as being in communication with WAN 502, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 505 and private cloud 506 are both part of a larger hybrid cloud.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Improvements and modifications can be made to the foregoing without departing from the scope of the present invention.

What is claimed is:

1. A computer-implemented method for managing computational storage operations, comprising:

receiving a computational storage operation associated with a storage controller;

inspecting the computational storage operation to determine a type of computational storage operation;

identifying possible offload locations on storage devices for handling the type of computational storage operation;

inspecting a register of storage devices maintained with computational capabilities of the storage devices to determine candidate storage devices that can support the type of computational storage operation, wherein the register of storage devices maintaining computational capabilities of the storage devices is accessible via a network, such that any computational storage device in the network can inspect storage device capabilities of other storage devices in the network; and selecting a candidate storage device for handling the computational storage operation based on a comparison of respective estimated computational storage latency metrics for the candidate storage devices.

2. The computer-implemented method of claim 1, further comprising:

sending the computational storage operation to the selected candidate storage device; and copying results of the computational storage operation back to an original associated storage item.

3. The computer-implemented method of claim 1, wherein the register of storage devices is maintained with computational capabilities of the storage devices based on querying a storage device to:

identify whether the storage device is capable of performing the type of computational storage operation; and identify a measure of how performant the storage device is with respect to performing the type of computational storage operation.

4. The computer-implemented method of claim 1, further comprising estimating a computational storage latency metric for a storage device by:

sending a description of the computational storage operation to the storage device; and receiving, from the storage device, an estimate of how long it would take to process the computational storage operation.

5. The computer-implemented method of claim 1, further comprising estimating a computational storage latency metric for a storage device by periodically actively monitoring the storage device performance with known operations to gauge the storage device processing capabilities.

6. The computer-implemented method of claim 1, wherein an estimated computational storage latency metric is based on a measure of how long the computational storage operation is expected to take, plus a transmission time between the storage controller and a storage device.

7. The computer-implemented method of claim 6, wherein the estimated computational storage latency metric includes an estimated latency associated with performing subsequent writes associated with an output of the computational storage operation when the computational storage operation is a mutable operation.

8. The computer-implemented method of claim 1, further comprising filtering the storage devices based on respective current resource capacities of the storage devices.

9. The computer-implemented method of claim 8, wherein the respective current resource capacities of the storage devices are maintained in the register of storage devices.

10. The computer-implemented method of claim 1, wherein the type of computational storage operation is a deduplication operation, and identifying possible offload locations on storage devices for handling the type of computational storage operation further comprises:

performing a lookup on a forward metadata structure to determine if a storage item associated with the computational storage operation is a source item or a referrer item; and responsive to determining that the storage item is a referrer item:

identifying a source address and any associated replications, mirrors, or snapshots as the possible offload locations;

inspecting deduplication hash databases of respective pools for the possible offload locations, and identifying the storage devices associated with the possible offload locations.

11. The computer-implemented method of claim 1, wherein identifying possible offload locations on storage devices for handling the type of computational storage operation further comprises:

determining that a snapshot has been taken of a storage item associated with the computational storage operation, and that the snapshot data remains unchanged; and identifying a location of the snapshot as a possible offload location on a storage device.

12. The method of claim 1, wherein identifying possible offload locations on storage devices for handling the type of computational storage operation further comprises:

determining that a mirror or replication of a storage item associated with the computational storage operation exists; and identifying a location of the mirror or replication as a possible offload location on a storage device.

13. A computer-implemented method for managing computational storage operations, comprising:

receiving a computational storage operation associated with a storage controller;

inspecting the computational storage operation to determine a type of computational storage operation;

identifying possible offload locations on storage devices for handling the type of computational storage operation;

inspecting a register of storage devices maintained with computational capabilities of the storage devices to determine candidate storage devices that can support the type of computational storage operation; and selecting a candidate storage device for handling the computational storage operation based on a comparison of respective estimated computational storage latency metrics for the candidate storage devices, wherein an estimated computational storage latency metric is based on a measure of how long the computational storage operation is expected to take, plus a transmission time between the storage controller and a storage device.

14. The computer-implemented method of claim 13, further comprising:

sending the computational storage operation to the selected candidate storage device; and copying results of the computational storage operation back to an original associated storage item.

15. The computer-implemented method of claim 13, wherein the register of storage devices is maintained with computational capabilities of the storage devices based on querying a storage device to:

identify whether the storage device is capable of performing the type of computational storage operation; and identify a measure of how performant the storage device is with respect to performing the type of computational storage operation.

16. The computer-implemented method of claim 13, further comprising:

sending a description of the computational storage operation to the storage device; and receiving, from the storage device, an estimate of how long it would take to process the computational storage operation.

17. The computer-implemented method of claim 13, further comprising filtering the storage devices based on respective resource capacities of the storage devices.

18. A computer-implemented method for managing computational storage operations, comprising:

receiving a computational storage operation associated with a storage controller;

inspecting the computational storage operation to determine a type of computational storage operation;

identifying possible offload locations on storage devices for handling the type of computational storage operation;

inspecting a register of storage devices maintained with computational capabilities of the storage devices to determine candidate storage devices that can support the type of computational storage operation; and selecting a candidate storage device for handling the computational storage operation based on a comparison of respective estimated computational storage latency metrics for the candidate storage devices, wherein an estimated computational storage latency metric includes an estimated latency associated with performing subsequent writes associated with an output of the computational storage operation when the computational storage operation is a mutable operation.

* * * * *